United States Patent [19]
Kunz

[11] 3,709,416
[45] Jan. 9, 1973

[54] SPEED REGULATING SYSTEM
[76] Inventor: Bernard P. Kunz, 4981 S. Clarkson Street, Englewood, Colo. 80110
[22] Filed: Aug. 18, 1971
[21] Appl. No.: 172,745

[52] U.S. Cl. ............................226/2, 226/30, 226/95, 425/370
[51] Int. Cl. ..............................................B65h 23/18
[58] Field of Search............................226/27–31, 42, 226/95, 113, 2; 425/370; 156/205, 459, 462, 470–473

[56] References Cited

UNITED STATES PATENTS

| 2,916,072 | 12/1959 | Hallam | 226/28 |
|---|---|---|---|
| 3,050,109 | 8/1962 | Monaco | 226/24 |

Primary Examiner—Richard A. Schacher
Attorney—Sheridan, Ross & Fields

[57] ABSTRACT

Method is applied to apparatus for depositing a web-carrying film on a forming belt in which the film must be in contact with the belt at a first locus and must be out of contact at a second, upstream locus. Method comprises sensing lack of contact at first locus and increasing relative speed of film in response to signal, and sensing undesired contact at second locus and decreasing relative speed in response to signal.

Apparatus includes forming belt driven at constant speed through receiving station and web-carrying film driven at substantially constant speed related to belt speed with guide means to deposit film on belt at receiving station. First sensor at first locus in receiving station can sense lack of film contact with web and has servo system to control speed adjuster to increase relative speed of film drive. Second sensor at second locus in receiving station upstream of first locus can sense undesired film contact and has servo system to control speed adjuster to decrease relative speed of film drive. In preferred form, belt has series of apertures along at least one margin to be covered by film at first locus but not at second locus. Sensors are vacuum type and produce differential pressure signals at two loci indicating contact or no contact. Signals actuate servo motors to control speed adjuster.

13 Claims, 3 Drawing Figures

SPEED REGULATING SYSTEM

BACKGROUND OF THE INVENTION

This invention lies in the field of method and apparatus for controlling the speed of travel of an elongate flexible strip with respect to the speed of travel of a belt on which it is to be deposited at a receiving station, and is particularly suitable for use with an apparatus in which material to be formed to the shape of a component of honeycomb paneling is deposited on a belt having a configuration which will produce the desired component shape.

Many types of materials have been used for the production of corrugated board and honeycomb paneling and many types of apparatus have been used for producing the desired shapes and for securing paneling components to each other. One material which has been used for these purposes is so-called glass cloth or fiber glass. This is normally actual cloth woven of glass fibers or a felted mass of random glass fibers coated or impregnated with a suitable resin which is then cured. When such material is used, a great deal of rather complicated equipment is required to cut and form the relatively rigid sheets into component forms and assemble them into finished products.

A recent development has resulted in a machine which starts with raw materials and proceeds to make continuously corrugated strip material and continuous flat sheet material and secures them together to produce the article generally known in the trade as single faced corrugated sheet. Such a machine is disclosed and claimed in my application for patent on Method and Apparatus for Producing Core Material For Honeycomb Panels, filed on July 28, 1971 and bearing Ser. No. 166,817.

In that machine a corrugated metal belt is driven at a constant speed through a receiving station, and a thin, flexible closed loop film loosely surround the entire belt and carries a continuous web of fibrous felted material such as fiber glass, saturated with uncured resin, to the receiving station. At this point a reciprocating guide means or plate intermittently feeds the film and overlying web onto the belt, draping the material into the corrugations. The belt carries the material through a curing zone and it emerges as a relatively rigid strip of fiber reinforced resin with permanent lateral corrugations. A flat strip may also be formed from fiber glass and uncured resin, applied to the exposed side of the corrugated web downstream of the receiving station, and passed through the curing zone to unite with the first strip and form a single faced corrugated sheet.

The intermittent feeding mentioned above is necessary to properly drape the film and web down into the valleys of the successive corrugations, and the lineal speed of the web must be substantially greater than that of the belt to supply sufficient material. The ratio depends on the size and shape of the corrugations and in one typical case is about 1.5 to 1. Because of slippage in the drive means or minor mismatch of initial ratios, the film feed may be too fast or too slow. If it is too slow, the film will not drape fully into the valleys of the corrugations. If it is too fast, excess material will pile up at the feeding point. Either of these results will produce a defective product.

SUMMARY OF THE INVENTION

The present invention provides a reliable and relatively simple system for constantly monitoring the feed at the receiving station and constantly adjusting the film drive speed to insure the presence of the correct amount of film and web at the receiving station at all times.

Generally stated, in its presently preferred form, the apparatus which is used in the practice of the method includes an endless corrugated belt mounted on a pair of spaced rollers and arranged in a generally horizontal plane and driven at a constant speed by one or both of the rollers. A forming or receiving station is defined adjacent to the first roller and the belt travels through this station to a curing zone.

A support belt or film is formed as an endless loop loosely surrounding the forming belt and passes over a support and drive roll where it picks up a continuous web of felted fibrous material wetted with uncured resin and carries it onward to the receiving station. At this point, a reciprocating guide means or feed plate intermittently drapes the film and its web onto the belt and down into the valleys of the corrugations. While the feed plate is retreating, extra film is supplied to it by the constant speed of the film drive so that there will be enough available for the next draping action. If the film drive is too slow, there will not be enough material to seat in the valleys. If it is too fast, excess material will pile up and produce folds.

As described in my previous application, apertures are formed in the valleys of all of the corrugations and a vacuum box under the belt draws the film down into the valleys. Similar apertures are formed in one or both margins of the belt and vacuum sensors are located in the receiving station directly beneath the paths of these latter apertures. A first sensor is at the locus where the film normally has just made contact with the valley and overlies and blocks the associated aperture. The second sensor is at a locus a short distance upstream of the first sensor where the film normally has not yet made contact with the valley and thus does not block the associated aperture.

A vacuum source is connected to each sensor by a vacuum line in which a servo motor is interposed, each line also including a solenoid valve between the servo motor and the vacuum source. Each servo motor is also connected to the control member of a speed adjuster to cause it to increase or decrease the film drive speed as required.

The first sensor is movable toward and away from the belt by a lever which has a cam member engaged by each passing corrugation. The parts are so dimensioned that when the lever is displaced by one corrugation the sensor port engages another corrugation and communicates with the marginal aperture in its valley. This corrugation is the one in which the film should make full contact. As the lever is displaced, it actuates a switch which closes a circuit to the solenoid valve in the associated vacuum line and causes it to open momentarily, applying a vacuum to the first sensor. The associated servo motor is so formed that if the aperture is blocked as it should be a balanced pressure results and no force is produced. On the other hand, if the film is not in contact, an unbalanced pressure results and the servo motor moves the control member of the speed adjuster in a direction to increase the film drive speed.

The second sensor is formed and arranged in substantially the same way as the first sensor. However, the servo motor is modified so that if the aperture is unblocked as it should be then the servo motor does not act, but if the aperture is blocked a differential pressure is produced and the servo motor moves the control member of the speed adjuster in a direction to decrease the film drive speed.

BRIEF DESCRIPTION OF THE DRAWINGS

Various other advantages and features of novelty will become apparent as the description proceeds in conjunction with the accompanying drawings, in which:

FIG. 3 is a schematic view of a modified sensor arrangement.

DESCRIPTION OF PREFERRED EMBODIMENTS

Figure 1:
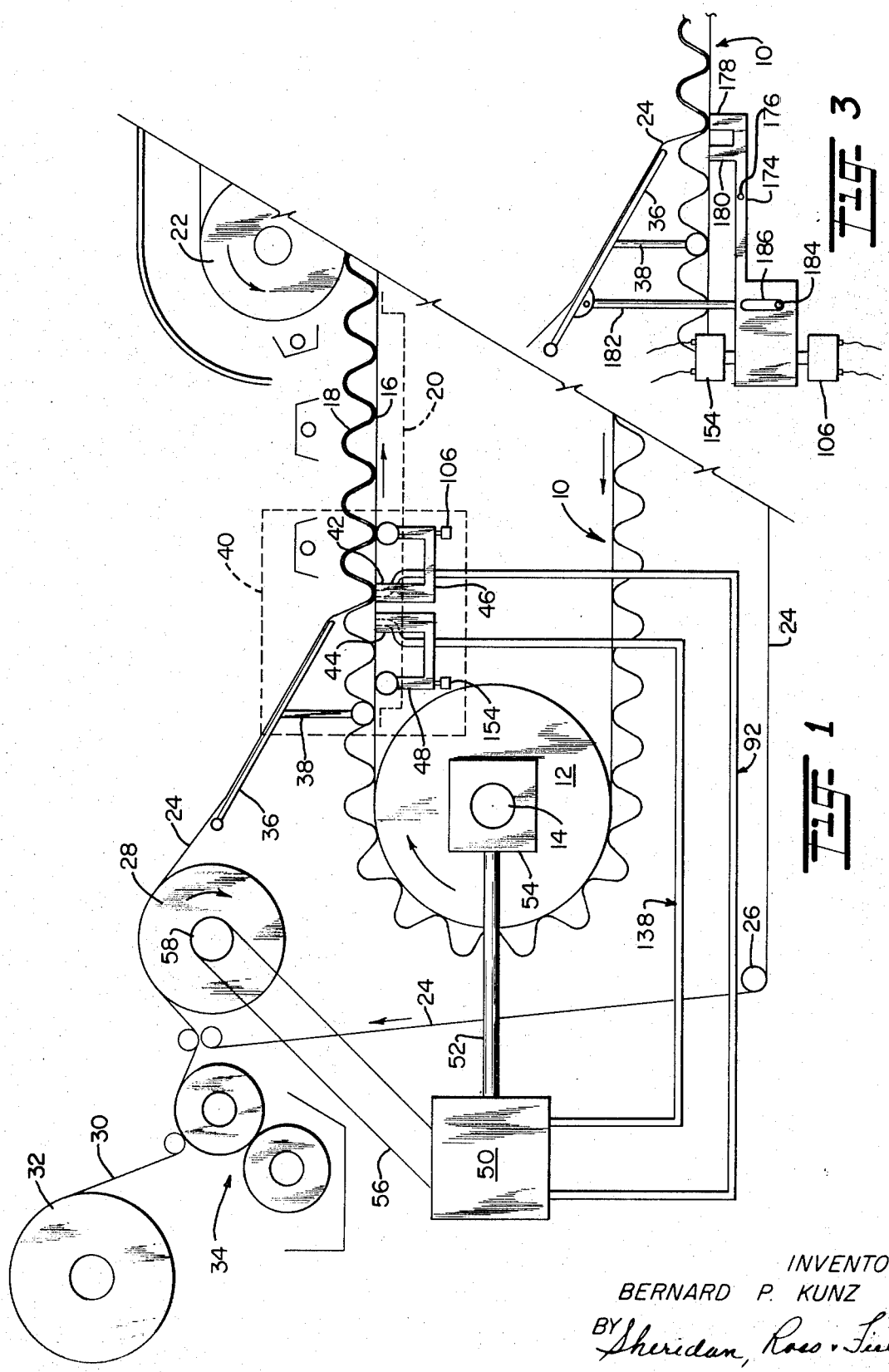
FIG. 1 is a fragmentary schematic view in side elevation of the portion of the forming apparatus to which the speed regulating system of the invention is applied.

A portion of the apparatus to which the invention is applied is schematically illustrated in FIG. 1, in which a corrugated belt 10 passes over a drive roller 12 which is mounted on drive shaft 14 powered by any suitable means to maintain a constant speed of belt travel. The valley 16 of each corrugation 18 is provided with a plurality of apertures spaced across the width of the belt, and a vacuum box 20 is located beneath the belt to draw air down through the apertures and pull a support film snugly into each valley to properly form the web carried by the film. The belt proceeds downstream to a curing zone under roller 22 which deposits a second resin impregnated web on the corrugated web to produce a component of an eventual honeycomb panel.

A film 24 of thin, though, flexible material, such as Teflon, travels around a guide roller 26 up to and over support and drive roller 28, where it picks up a continuous web 30 of felted fibrous material which has been supplied from reel 32 and impregnated with uncured resin by coating device 34. The film, with its overlying web, then travels down over the reciprocating guide means or feed plate 36. As the belt travels downstream, the feed plate is reciprocated by contact of its cam follower 38 with each successive corrugation. As it lowers, it drapes the film into the appropriate valley where it is pulled and held in place by the action of the vacuum box. As it rises, it slides up under the oncoming film to gather a new portion for draping into the next valley. The receiving station indicated by broken lines 40 constitutes the zone in which the draping and initiation of forming are accomplished.

As stated previously, the film must travel at some constant speed greater than the belt speed, such as a ratio of 1.5 to 1, in order to supply enough material to fill the corrugations, but variations such as slippage or mismatch of drive ratios may result in too much or too little material. Consequently, monitoring means are provided at the receiving station to constantly determine the supply condition and provide signals for remedying any departure from normal.

For this purpose, first and second sensors 42 and 44 are provided at the receiving station and actuated by lever members 46 and 48. They are connected by vacuum conduit means to a vacuum source in control center 50 containing the various regulating components shown in FIG. 2. Shaft 14 of roller 12 drives a shaft 52 through gear box 54, and the shaft 52 in turn drives a speed regulator having an output shaft. The latter is connected to driving means such as chain 56 which drives the shaft 58 of roller 28.

Figure 2:
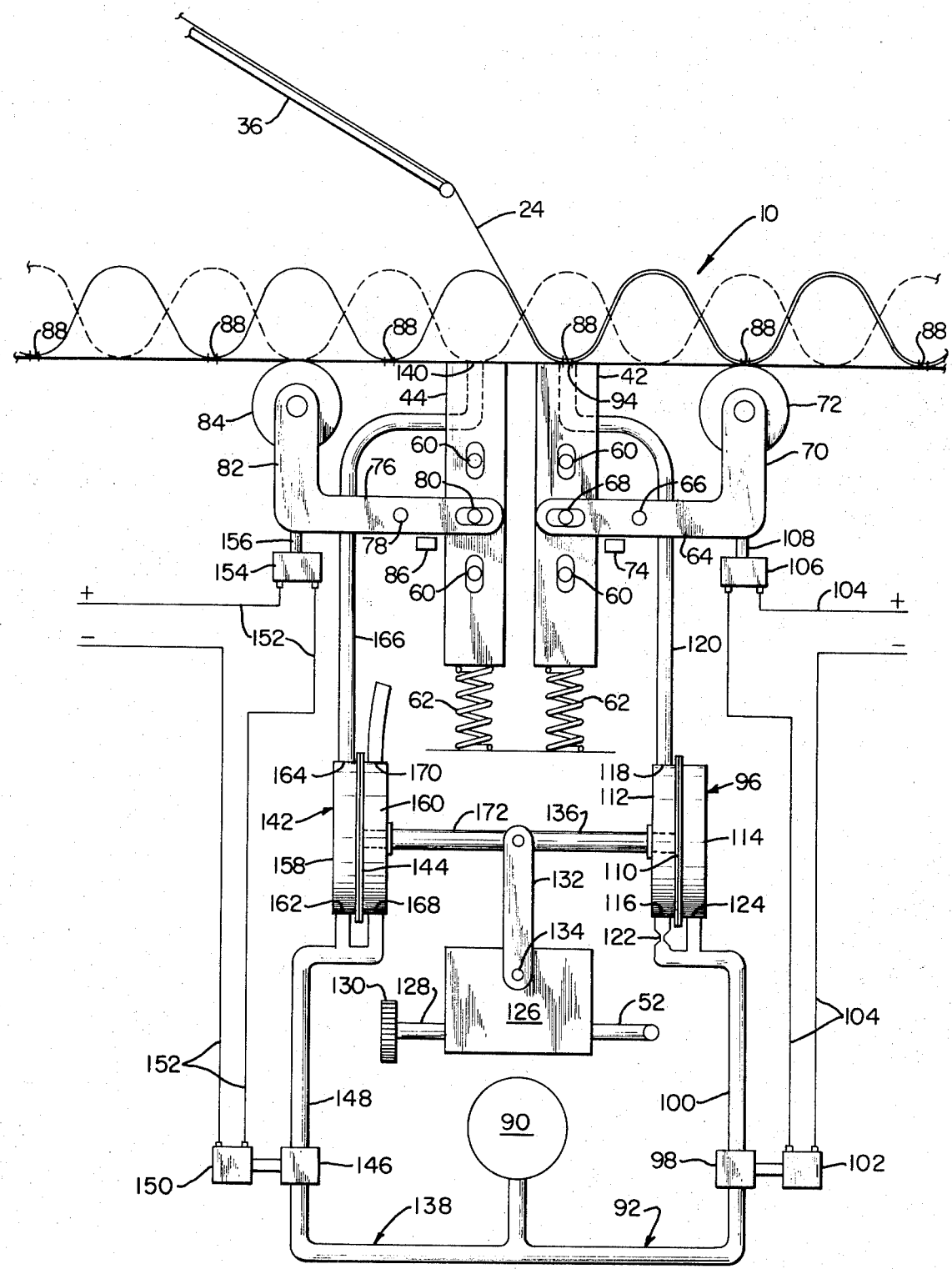
FIG. 2 is a schematic view of the system as applied to the apparatus.

The details of the regulating system are shown in FIG. 2, where it will be seen that sensors 42 and 44 are slidably mounted immediately beneath belt 10 and movable toward and away from it by means of pin and slot connections 60. Springs 62 are biased to pull the sensors away from the belt. A first lever 64, pivoted at 66, engages the first sensor at pin and slot connection 68, and is provided with an arm 70 having a cam follower in the form of a rubber faced wheel 72. When the lever engages stop 74, its cam wheel 72 lies slightly in the path of movement of the corrugations. Therefore, each time a corrugation passes, it displaces the cam wheel, tilting the lever to cause the upper end of sensor 42 to engage the adjacent corrugation. As the corrugations move onward, spring 62 returns the lever to the stop. It will be noted that the cam wheel and the sensor are spaced exactly one corrugation apart.

A second lever 76, pivoted at 78, engages the second sensor at pin and slot connection 80, and is provided with an arm 82 having a cam wheel 84, and spring 62 biases the lever toward stop 86. This assembly operates in exactly the same way as the first sensor assembly described above.

In addition to the apertures in the belt which cooperate with vacuum box 20 to hold the film in place, the belt is also provided with a series of apertures 88 along one or both margins in the valleys of the corrugations. As may be seen in FIG. 2, one aperture of the belt as shown in solid lines is directly over sensor 42, and the film 24 which has been draped in place by feed plate 36 overlies the aperture and blocks it and is just about to contact the remainder of the corrugation. This is the normal, correct relation of the elements which is to be retained by the servo means to be described.

A vacuum source, such as a conventional vacuum pump 90 is connected by vacuum conduit means 92 to sensor 42 which is provided with a vacuum port 94 which is intermittently placed in communication with aperture 88 in the belt. A servo motor including casing 96 is interposed in the conduit means and a valve 98 is interposed in a first portion 100 of the conduit means and provided with a solenoid 102 which is electrically connected in a circuit 104 with an electric switch 106, preferably of the snap action type marketed under the name "Microswitch". The switch has an actuator pin 108 adjacent to lever 64.

Casing 96 is divided internally by movable diaphragm 110 into a first compartment 112 and a second compartment 114. The first compartment actually forms a part of vacuum conduit means 92 and has a first port 116 connected to the first conduit portion 100 and a second port 118 connected to the second conduit portion 120 leading to the sensor. In some cases it is desirable to provide a constriction 122 in the connection between port 116 and conduit portion 100. The second compartment 114 has a single port 124 connected to conduit portion 100 between the restriction and valve 98, and is otherwise sealed.

A speed adjuster 126 has an input shaft 52 from the belt drive shaft 14 of FIG. 1, and has an output shaft 128 which is connected by a sprocket 130 to the chain 56 which drives support roller 28. The input shaft runs at constant speed and the internal mechanism of the conventional speed adjuster 126 drives the output shaft 128 normally at a predetermined constant speed. This latter speed may be adjusted faster or slower by the movable control member 132, here shown as a lever mounted on pivot shaft 134. The pivot shaft is provided with a spring loaded drag brake, not shown, which allows it to be moved by external force but restrains it in any adjusted position. Since the speed adjuster is intended to maintain a rather constant speed relation for the purposes of the present invention it needs only a limited range of about plus or minus 2 to 5 percent. Lever 132 is connected to diaphragm 110 by link 136.

When the phase relationships are normal as indicated in the showing of FIG. 2, a moving corrugation will displace cam wheel 72, rotating lever 64 and causing vacuum port 94 of sensor 42 to engage the next corrugation and communicate with an aperture 88. As indicated, film 24 is in contact with the valley so that it overlies and blocks aperture 88. At the same time, the deflection of lever 64 closes switch 106 to activate solenoid 102 and open valve 98 momentarily. Vacuum pump 90 is operating continuously so that a vacuum is immediately applied through conduit means 92 to the vacuum port 94. Since the aperture 88 is blocked, no air will flow into the sensor, and the vacuum will be maintained throughout the system. Therefore, there will be no pressure differential across diaphragm 110 and it will not move control member 132.

On the other hand, if the film speed is lagging, the film will be out of contact with the valley and will not block aperture 88. Consequently, air will enter the sensor and the pressure will be higher in compartment 112 than in compartment 114. This pressure differential will cause the diaphragm to pull lever 132 toward it and increase the film drive speed. Since constriction 122 cuts down the rate of flow from compartment 112 to the vacuum source, the differential pressure in the casing is increased. Since the valve is open only momentarily there will be only a small motion and a small speed adjustment. Very fine control can be obtained this way because there is a possible adjustment for every corrugation which passes the sensor.

The system for controlling excessive speed of the film drive is similar in general but differs in detail. In this case vacuum source 90 is connected by vacuum conduit means 138 to sensor 44 which is provided with a vacuum port 140 which is intermittently placed in communication with aperture 88 in the belt. As shown, sensor 44 is only a short distance upstream of sensor 42, about one half the distance between corrugations, and is activated when the belt is in the position indicated in broken lines. A servo motor including casing 142 is interposed in the vacuum conduit means 138 and a valve 146 is interposed in a first portion 148 of the conduit means and provided with a solenoid 150 which is electrically connected in a circuit 152 with an electric switch 154, also of the snap action type. The switch has an actuator pin 156 adjacent to lever 76.

Casing 142 is divided internally by movable diaphragm 144 into a first compartment 158 and a second compartment 160. The first compartment actually forms a part of vacuum conduit means 138 and has a first port 162 connected to the first conduit portion 148 and a second port 164 connected to the second conduit portion 166 leading to the sensor. The second compartment 160 has a first port 168 connected to conduit portion 148 and a second port 170 open to the atmosphere. Diaphragm 144 is connected to lever 132 by link 172.

When the phase relationships are normal and the corrugations are just reaching the position indicated by broken lines in FIG. 2, a moving corrugation will displace cam wheel 84, rotating lever 76 and causing vacuum port 140 of sensor 44 to engage the next corrugation downstream and communicate with an aperture 88. Since conditions are assumed normal, film 24 will be out of contact with the valley above sensor 44. As in the previous example, switch 154 is actuated to close a circuit through solenoid 150 and open valve 146 momentarily. A vacuum is immediately applied through conduit means 138 to the vacuum port 140. Since the aperture 88 is not blocked, air will flow freely into sensor 44 and into compartment 158. Air will also flow freely into compartment 160. There will be no pressure differential in the casing and diaphragm 144 will not act to move lever 132.

On the other hand, if the film speed is excessive, the film will contact the valley over sensor 44 and block the associated aperture 88. Consequently, the vacuum will be maintained in compartment 158 while compartment 160 is at atmospheric pressure. Therefore, the differential pressure will actuate the diaphragm 144 to pull lever 132 toward it and cause a reduction of speed in the output shaft.

As pointed out previously, the drag brake on pivot shaft 134 will cause lever 132 to remain in any adjusted position until a further correction occurs.

The modification of FIG. 3 is a form in which two sensors are unitarily mounted. A support arm 174 is pivoted at 176 and carries two spaced sensors 178 and 180 adapted to be pivoted into engagement with the corrugations. The reciprocating movement of feed plate 36 acts through link 182, pin 184, and slot 186 to raise and lower arm 174 to the desired degree at the proper moment. Bias spring means maintain the arm in neutral position between impulses. Switches 106 and 154 are actuated by arm 174 in the same manner as in the previous embodiments.

It will be understood, that if desired a mechanical means can be substituted for the electrical circuits shown to operate each of valves 98 and 146 as will be apparent to one of ordinary skill in the art.

What is claimed is:

1. A speed regulating system for use in combination with a web feeding and forming apparatus, comprising:
   a corrugated forming belt having means to drive it at a constant speed in a predetermined direction;
   a receiving station at a selected position along the path of travel of the belt;
   a support film to carry a continuous web of material to the belt to be formed with a multiplicity of laterally extending corrugations;

drive means to feed the film toward the belt at a substantially constant speed which bears a predetermined relation to the speed of travel of the belt;
guide means to intermittently advance the film and drape it into the corrugations of the belt at the receiving station to initiate the forming process;
the belt being provided along at least one of its margins with a series of apertures therethrough at the valleys of the corrugations adapted to be covered by the film as it is deposited therein;
a speed adjuster driven by the belt drive means and connected to the film drive means to control the speed of the latter;
a first sensor means at the receiving station at a locus where the film is normally in contact with the valley of a corrugation and overlying its associated aperture and adapted to sense the absence of such contact;
first servo means connected between the first sensor and the speed adjuster and acting in response to the absence of contact to cause the speed adjuster to increase the speed of travel of the film;
a second sensor at the receiving station located upstream of the first sensor with respect to the direction of travel of the belt, at a locus where the film is normally out of contact with the valley of a corrugation and spaced from its associated aperture, and adapted to sense the presence of such contact;
and second servo means connected between the second sensor and the speed adjuster acting in response to the presence of contact to cause the speed adjuster to decrease the speed of travel of the film.

2. A system as claimed in claim 1;
the speed adjuster having a movable control member;
each sensor having a vacuum port adapted to contact the corrugations at the apertures;
the servo means comprising a vacuum source, vacuum conduit means extending from the vacuum source to each of the sensors, a servo motor interposed in each of the vacuum conduit means, and a normally closed valve in each of the conduit means between the respective servo motor and the vacuum source;
means to intermittently cause each sensor port to contact the adjacent corrugation and communicate with its associated aperture and to momentarily open the associated valve to apply a vacuum to the sensor to produce a pressure indication of the presence or absence of contact of the film with the valley of the corrugation;
each servo motor being differentially actuated by pressure variations in its associated vacuum conduit means and connected to the control member of the speed adjuster to move it in the appropriate direction to modify the speed of travel of the film.

3. A system as claimed in claim 2; in which
the first servo motor comprises a casing having a movable diaphragm therewithin dividing it into two compartments;
the first compartment forming a part of the first vacuum conduit means and having a first port connected to the first portion of the conduit means leading to the vacuum source and a second port connected to the second portion of the conduit means leading to the first sensor;
the second compartment having a port connected to the first portion of the conduit means and being otherwise sealed;
and the movable diaphragm being connected to the control member of the speed adjuster.

4. A system as claimed in claim 3;
and a constriction being formed in the connection between the first port of the first compartment and the first portion of the conduit means to restrict flow from the first compartment to the vacuum source; the second compartment being connected to the conduit means between the constriction and the valve.

5. A system as claimed in claim 2; in which
the second servo motor comprises a casing having a movable diaphragm therewithin dividing it into two compartments;
the first compartment forming a part of the second vacuum conduit means and having a first port connected to the first portion of the conduit means leading to the vacuum source and a second port connected to the second portion of the conduit means leading to the second sensor;
the second compartment having a first port connected to the first portion of the conduit means and a second port open to the atmosphere;
and the movable diaphragm being connected to the control member of the speed adjuster.

6. A system as claimed in claim 2;
the sensors being mounted for movement toward and away from the corrugated belt;
the means for intermittently moving them comprising lever means actuated by the corrugations of the belt as they move longitudinally.

7. A system as claimed in claim 2;
each sensor being individually mounted for movement toward and away from the corrugated belt;
the means for moving each sensor comprising a pivoted lever connected to its respective sensor and provided with a cam member lying in the path of travel of the corrugations to be displaced by each of them successively.

8. A system as claimed in claim 7;
the means to momentarily open the vacuum valves comprising a solenoid for each valve, and a switch actuated by the movement of its associated lever to close an electrical circuit to its associated solenoid.

9. A system for regulating the speed of travel of a film with respect to the speed of travel of a belt on which it is to be deposited comprising:
a belt having means to drive it at a constant speed in a predetermined direction;
a film provided with drive means to feed it toward the belt at a substantially constant speed which bears a predetermined relation to the speed of travel of the belt;
a speed adjuster driven by the belt drive means and connected to the film drive means to control its speed;
a receiving station at which the film is deposited on the belt;

a first sensor at the receiving station at a locus where the film is normally in contact with the belt and adapted to sense the absence of such contact;

first servo means connected between the first sensor and the speed adjuster and acting in response to the absence of contact to cause the speed adjuster to increase the speed of travel of the film;

a second sensor at the receiving station located upstream of the first sensor with respect to the direction of travel of the belt, at a locus where the film is normally out of contact with the belt, and adapted to sense the presence of such contact;

and second servo means connected between the second sensor and the speed adjuster acting in response to the presence of contact to cause the speed adjuster to decrease the speed of travel of the film.

10. A system as claimed in claim 9;

the belt being provided along at least one of its margins with a continuous series of apertures adapted to be covered by the film as it is deposited;

the speed adjuster having a movable control member;

each sensor having a vacuum port adapted to contact the belt at the successive apertures as they pass;

the servo means comprising a vacuum source, vacuum conduit means extending from the vacuum source to each of the sensors, a servo motor interposed in each of the vacuum conduit means and a normally closed valve in each of the conduit means between the respective servo motor and the vacuum source;

means to intermittently cause each sensor port to contact the adjacent portion of the belt and communicate with its associated aperture and to momentarily open the associated valve to apply a vacuum to the sensor to produce a pressure indication of the presence or absence of contact of the film with the belt at the aperture;

each servo motor being differentially actuated by pressure variations in its associated vacuum conduit means and connected to the control member of the speed adjuster to move it in the appropriate direction to modify the speed of travel of the film.

11. A system as claimed in claim 10; in which the first servo motor comprises a casing having a movable diaphragm therewithin dividing it into two compartments;

the first compartment forming a part of the first vacuum conduit means and having a first port connected to the first portion of the conduit means leading to the vacuum source and a second port connected to the second portion of the conduit means leading to the first sensor;

the second compartment having a port connected to the first portion of the conduit means and being otherwise sealed;

and the movable diaphragm being connected to the control member of the speed adjuster.

12. A system as claimed in claim 10; in which the second servo motor comprises a casing having a movable diaphragm therewithin dividing it into two compartments;

the first compartment forming a part of the second vacuum conduit means and having a first port connected to the first portion of the conduit means leading to the vacuum source and a second port connected to the second portion of the conduit means leading to the second sensor;

the second compartment having a first port connected to the first portion of the conduit means and a second port open to the atmosphere;

and the movable diaphragm being connected to the control member of the speed adjuster.

13. A method of adjusting the speed of travel of a film with respect to the speed of travel of a belt in which the film is to be deposited, comprising:

selecting a first locus at which the film is normally in contact with the belt;

sensing the absence of contact of the film with the belt at the first locus;

and increasing the speed of travel of the film with respect to the speed of travel of the belt in response to the sensing signal;

selecting a second locus upstream of the first locus with respect to the direction of travel of the belt, at which the film is normally out of contact with the belt;

sensing the presence of contact of the film with the belt at the second locus;

and decreasing the speed of travel of the film with respect to the speed of travel of the belt in response to the second sensing signal.

* * * * *